Patented Mar. 27, 1951

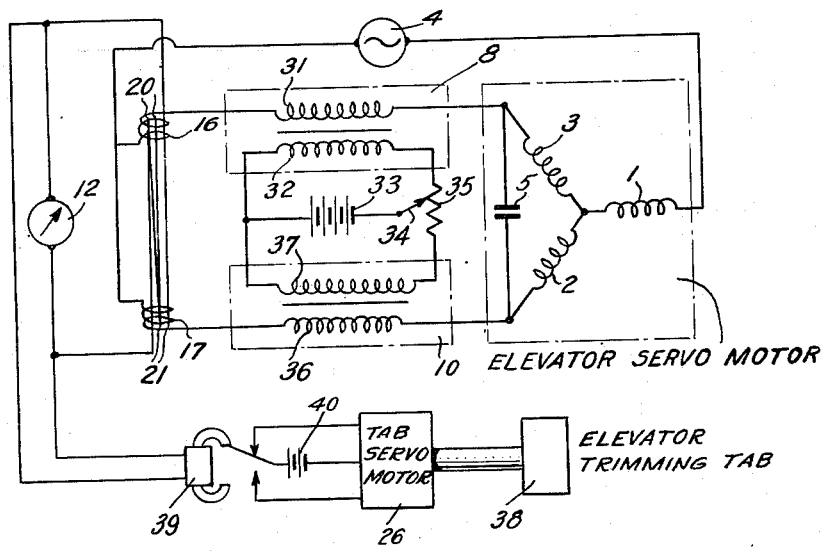

2,546,555

UNITED STATES PATENT OFFICE 2,546,555

AUTOMATIC CONTROL AND INDICATING SYSTEM FOR CRAFTS

Frederick William Meredith, London, and Frederick Roger Milsom, Boreham Wood, England, assignors to S. Smith & Sons (England) Limited, London, England, a British company Application February 25, 1947, Serial No. 730,874
In Great Britain February 14, 1946

Section 1, Public Law 690, August 8, 1946
Patent expires February 14, 1966

4 Claims. (Cl. 177—311)

1

This invention relates to automatic control systems for aircraft or watercraft and more particularly to systems in which the control surfaces are electrically actuated.

It is often desirable to provide means for detecting out-of-trim conditions to enable auxiliary control surfaces or trimming tabs to be operated manually or automatically to correct the out-of-trim conditions. Out-of-trim conditions give rise to a torque reaction on the servo-motor and in the case of a hydraulic servo-motor this may readily be detected by measuring the differential pressure acting on the piston of the servo-motor. In the case of an electric servo-motor, however, this torque reaction is not so easily detected since on the steady current necessary to supply the torque necessitated by the out-of-trim condition are superimposed current fluctuations necessary to effect control and it is necessary to distinguish between these two currents and the object of the present invention is to provide a circuit for effecting the necessary discrimination.

In an automatic control system for aircraft or watercraft having an electric servo-motor actuating a main control surface, according to the present invention, current is supplied to the servo-motor through one or other of two circuits according as the motor is to rotate in one direction or the other and a current-responsive device is arranged in each circuit and the output from these devices is applied in opposition to an instrument which will indicate any unbalance caused by the torque reaction due to out-of-trim conditions. The instrument may indicate the degree of torque reaction due to out-of-trim conditions or the instrument may operate a trimming tab to correct the out-of-trim conditions.

In one form of the present invention current is supplied to the servo-motor through one or other of two circuits according as the motor is to rotate in one direction or the other and a thermocouple is arranged in conjunction with each circuit so that the current flowing through a heating coil in the circuit will heat the thermocouple and the outputs from the two thermocouples are then applied in opposition to a centre zero instrument which will indicate any unbalance of the heating current. In practice each thermocouple may comprise a number of elements with the wires packed side by side to form a core around which the heating coil is wound.

The invention will now be described by way of example with reference to the drawing showing a circuit for controlling a servo-motor operating the elevators of an aircraft.

2

In the single figure of drawing a three-phase hysteresis motor of the kind described in British Patents Nos. 576,248 and 576,249 is used. The three phases 1, 2 and 3 are connected in star and excited from a single phase supply 4, a phase-splitting condenser 5 being provided. To effect rotation in one direction current flows through a circuit comprising a heating coil 16 and a saturable inductance or transductor 8. To effect rotation in the other direction current flows through a heating coil 17 and a saturable inductance or transductor 19. The transductor 8 comprises a power winding 31 and a control winding 32 upon a common iron core. The power winding 31 is connected in series with the phase winding 3 of the elevator servomotor while a variable direct current is passed through control winding 32 and, by varying the saturation of the core, varies the impedance of power winding 31. The transductor 19 similarly comprises a power-winding 36 and control winding 37, the power winding 36 being connected in series with the phase-winding 2 of the elevator servomotor. Means are provided for varying differentially the control currents through windings 32, 37. These means do not form part of the present invention, and are symbolised by the D. C. source 33 and the potentiometer 35. One terminal of winding 32 is shown connected both to one terminal of winding 37 and to one terminal of source 33. The other terminals of windings 32, 37 are connected to opposite terminals of potentiometer 35 and the slider 34 of the potentiometer 35 is connected to the remaining terminal of source 33. Thus by movement of the slider 34 from its mid-position the current through one of windings 32, 37 will be increased and that through the other decreased. This will result in decrease in the impedance of one of the power windings 31, 36 and an increase in the impedance of the other, and thus the elevator servomotor will be caused to generate a torque in one direction or the other. Variation of the control currents would be in practice produced by the main elevator automatic control system which controls the elevator to maintain horizontal flight but, as stated above, this control system does not form part of the present invention and is accordingly not illustrated.

Within the heating coil 16 is a thermopile 20 comprising a number of elements packed side by side to form a core around which the heating coil 16 is wound. Within the heating coil 17 is a thermopile 21.

The outputs of two thermopiles 20 and 21 are coupled in opposition through channels 23 and 24 to a centre zero instrument 12 such as a galvanometer. There may be connected in parallel with (or as an alternative to) the meter 12 a polarised relay 39 controlling the supply of electricity from the D. C. source 40 to the reversible D. C. tab servomotor represented by the block 26 which controls the elevator trimming tab 38.

In operation, if the currents in the coils 16 and 17 are equal (for example, if the aircraft is correctly trimmed) the centre zero instrument will be unaffected. If, however, out-of-trim conditions exist about the pitch axis, then the torque reaction on the servo-motor necessary to maintain horizontal flight will result in an increase of the mean current flow through one or other of the heating coils 16 and 17. This will result in a corresponding unbalance between the thermopiles 20 and 21 which is indicated on the instrument 12. The pilot may then operate the trimming tabs until the instrument 12 reads zero. If the modification including the relay 39 and the tab servomotor 26 is used, this motor will be caused to operate the trimming tab to reduce the torque reaction on the elevator servo motor and so reduce the net output from the two thermocouples 16, 17.

We claim:

1. In an automatic control system for a craft comprising an electric servo-motor for actuating a control surface and two alternative circuits through which current is supplied to the said motor, the current through one or other of said circuits being greater according as the motor is to rotate in one direction or the other the combination of, a heating coil arranged in each of the said circuits, a thermocouple associated with each heating coil and heated by the current flowing through the coil, and a centre zero instrument to which are applied in opposition the outputs from the said thermocouples and which will indicate any unbalance of the heating current caused by the craft being in an out-of-trim condition.

2. In an automatic control system for a craft comprising an electric servo-motor for actuating a control surface and two alternative circuits through which current is supplied to the said motor, the current through one or other of said circuits being greater according as the motor is to rotate in one direction or the other the combination of, a heating coil arranged in each of the said circuits, a thermocouple, associated with each heating coil and heated by the current flowing through the coil, comprising a number of elements with the wires packed side by side to form a core around which the heating coil is wound, and a centre zero instrument to which are applied in opposition the outputs from the said thermocouples and which will indicate any unbalance of the heating current caused by the craft being in an out-of-trim condition.

3. In an automatic control system for a craft comprising an electric servo-motor for actuating a control surface and two alternative circuits through which current is supplied to the said motor, the current through one or other of said circuits being greater according as to whether the motor is to generate a torque in one direction or the other, the combination of a heating coil arranged in each of the said circuits, a thermocouple associated with each heating coil and heated by the current through the coil and a further servo motor which is controlled in accordance with the outputs of said thermocouples connected in opposition, said further motor operating a trimming tab to correct the trim of the craft upon the occurrence of an out of trim condition of the craft necessitating the generation of a steady torque by the servo motor actuating the control surface.

4. In an automatic control system for craft comprising an electric servo-motor for actuating a control surface and two alternative circuits through which current is supplied to the said motor, the current through one or other of said circuits being greater according as to whether the motor is to generate a torque in one direction or the other, the combination of a heating coil arranged in each of the said circuits, a thermocouple, associated with each coil and heated by the current flowing through the coil, comprising a number of elements with the wires packed side by side to form a core around which the heating coil is wound, and a further servo-motor which is controlled in accordance with the outputs of said thermocouples connected in opposition, said further motor operating a trimming tab to correct the trim of the craft upon the occurrence of an out of trim condition of the craft necessitating the generation of a steady torque by the servo motor actuating the control surface.

FREDERICK WILLIAM MEREDITH.
FREDERICK ROGER MILSOM.

REFERENCES CITED

The following references are of record in the file of this patent:

UNITED STATES PATENTS

| Number | Name | Date |
|---|---|---|
| 1,821,273 | Pike | Sept. 1, 1931 |
| 1,890,891 | Vopel et al. | Dec. 13, 1932 |
| 1,895,240 | Vopel et al. | Jan. 24, 1933 |
| 1,966,170 | Greene | July 10, 1934 |
| 2,029,700 | Boykow | Feb. 4, 1936 |
| 2,214,181 | Rylsky | Sept. 10, 1940 |
| 2,232,982 | Tank | Feb. 25, 1941 |
| 2,310,955 | Hornfeck | Feb. 16, 1943 |
| 2,388,977 | Johnson | Nov. 13, 1945 |
| 2,428,402 | Winterbottom | Oct. 7, 1947 |
| 2,468,447 | Johnson | Apr. 26, 1949 |